United States Patent [19]
Weiss et al.

[11] 3,960,631
[45] June 1, 1976

[54] METHOD OF MAKING A LINER CONSTRUCTION

[75] Inventors: Leonard E. Weiss; Kenneth L. Hortin, both of Evansville, Ind.

[73] Assignee: Whirlpool Corporation, Benton Harbor, Mich.

[22] Filed: Aug. 30, 1974

[21] Appl. No.: 502,006

[52] U.S. Cl. .............................. 156/244; 156/289; 264/45.1; 312/214
[51] Int. Cl.² .................... B29F 3/00; B32B 31/30; C09J 7/00; F25D 23/08
[58] Field of Search ............... 312/214; 156/77, 78, 156/79, 244, 289, 332; 264/45.1, 45.4, 242, 300

[56] References Cited
UNITED STATES PATENTS

| | | | |
|---|---|---|---|
| 1,576,955 | 3/1926 | Dubraks | 312/214 |
| 2,106,840 | 2/1938 | Gould | 312/214 |
| 2,779,066 | 1/1957 | Gaugler et al. | 312/214 |
| 2,958,210 | 11/1960 | Rill, Jr. | 312/214 |
| 3,078,003 | 2/1963 | Kesling | 312/214 |
| 3,132,382 | 5/1964 | Magester | 312/214 |
| 3,240,029 | 3/1966 | Wurtz | 312/214 |
| 3,294,462 | 12/1966 | Kesling | 312/214 |
| 3,401,997 | 9/1968 | Hanifan | 312/214 |
| 3,539,424 | 11/1970 | Tashlick | 156/289 |
| 3,688,384 | 9/1972 | Mizushima et al. | 312/214 |
| 3,697,368 | 10/1972 | Bhuta et al. | 156/244 |
| 3,790,243 | 2/1974 | Whorton | 312/214 |
| 3,804,481 | 4/1974 | Tillman | 312/214 |

FOREIGN PATENTS OR APPLICATIONS

| | | | |
|---|---|---|---|
| 558,735 | 3/1957 | Italy | 312/214 |
| 1,182,087 | 6/1959 | France | 312/214 |

*Primary Examiner*—Caleb Weston
*Attorney, Agent, or Firm*—Wegner, Stellman, McCord, Wiles & Wood

[57] ABSTRACT

A refrigeration appliance liner and method of fabricating the same. The liner includes a plastic wall provided with a release layer on one surface formed of a material having a limited adhesion with an insulating foam which is subsequently foamed-in-place thereagainst thereby permitting separation of the liner from the foam as a result of differential thermal contraction of the liner and foam thereby avoiding stress cracking of the liner. The liner wall is defined by a sheet of the plastic material which is provided with the release layer and subsequently formed into the desired refrigerator liner configuration.

9 Claims, 5 Drawing Figures

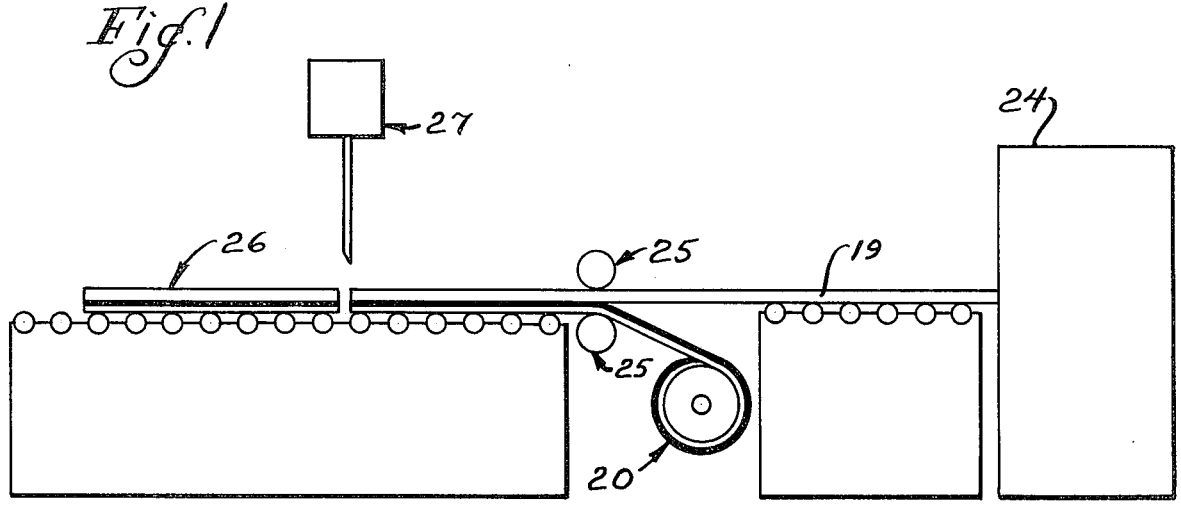
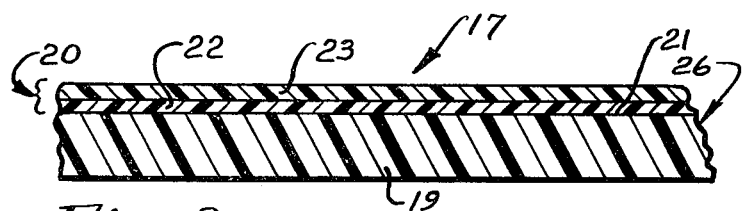
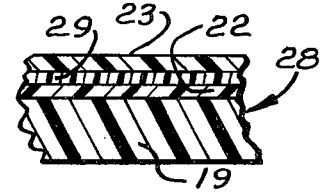
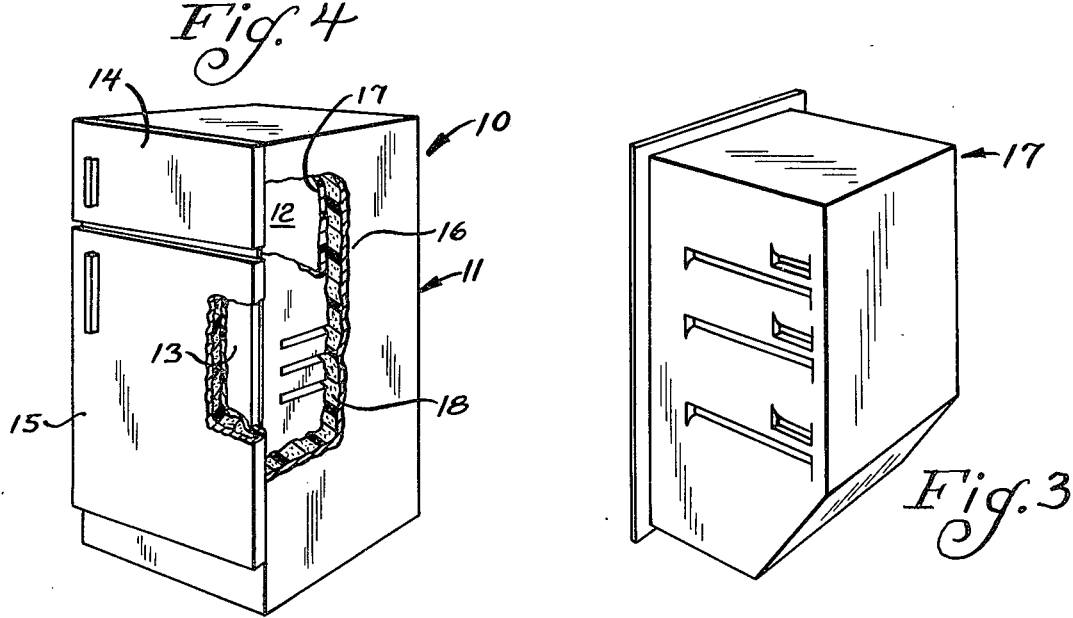

METHOD OF MAKING A LINER CONSTRUCTION

BACKGROUND OF THE INVENTION

1. Field of the Invention

This invention relates to refrigeration apparatus and in particular to a liner construction for use therein.

2. Description of the Prior Art

One conventional method of forming a refrigeration appliance cabinet is to provide an inner liner wall and an outwardly spaced outer cabinet wall. Insulation is provided in the space between the two walls by foaming in place a foam insulation material, such as polyurethane. A problem arises in conventional such cabinet constructions in that the foamed-in-place insulation tends to adhere to the liner wall. The liner wall is conventionally formed of a synthetic resin, such as high impact polystyrene (HIPS), Acrylonitrile-butadiene-styrene (ABS), etc. resins. The adhesion of the foamed-in-place insulation to the synthetic resin liner wall may cause stress cracking thereof as a result of the differential thermal expansion of the insulation and liner wall plastic material.

It has, therefore, been proposed to apply a foam release agent to the liner wall subsequent to the forming thereof into the liner configuration. Such application of the foam release agent is relatively expensive requiring additional steps in the manufacturing process and involving additional relatively expensive labor. The provision of the foam release agent on the formed liner is illustrated in the U.S. Letters Patent of Keith K. Kesling U.S. Pat. Nos. 3,078,003 and 3,294,462, Colin S. Hocking et al. U.S. Pat. No. 3,150,796, and Paul E. Kronenberger U.S. Pat. No. 3,719,303. As disclosed therein, the protective layer may be applied to selective portions of the liner as desired.

SUMMARY OF THE INVENTION

The present invention comprehends an improved liner construction for use in refrigeration appliances and the like wherein a foam release agent is provided on the plastic liner sheet prior to the forming thereof into the liner configuration. The foam release agent may be provided in the form of a film laminated to the liner sheet as by utilizing the inherent heat of extrusion of the liner sheet and a pressure application therebetween such as by suitable pressure rolls.

The foam release film may further comprise a coextruded film defined by a laminate of a sheet of unmodified low density polyethylene and a sheet of ethylene acrylic acid copolymer. The ethylene acrylic acid copolymer is preferably electrostatically treated to promote adhesion thereof to either of the ABS or HIPS resins.

It has been found that this improved foam release film provides a suitable bond to permit the subsequent thermoforming of the liner configuration without separation of the film from the plastic liner wall, while yet permitting the film to be stripped therefrom if necessary to salvage damaged liners for reuse as by regrinding and then mixing with material fed to extrusion equipment.

The surface of the film engaged by the foam-in-place insulation provides a breakable bond therewith, thereby preventing stress cracking of the plastic liner as a result of differential thermal contraction of the liner and insulating foam.

Thus, the present invention comprehends an improved refrigeration appliance liner and method of fabricating the same which is simple and economical while yet providing the highly desirable features discussed above.

BRIEF DESCRIPTION OF THE DRAWING

Other features and advantages of the invention will be apparent from the following description taken in connection with the accompanying drawing wherein:

FIG. 1 is a schematic side elevation of an apparatus for forming an improved liner construction embodying the invention;

FIG. 2 is a fragmentary enlarged vertical section of the liner construction;

FIG. 3 is a rear perspective view of the formed liner;

FIG. 4 is a front perspective view of a refrigeration appliance with the formed liner installed therein and with portions broken away to facilitate illustration of the construction of the apparatus; and FIG. 5 is a fragmentary enlarged vertical section of a modified liner construction embodying the invention.

DESCRIPTION OF THE PREFERRED EMBODIMENT

In the exemplary embodiment of the invention as disclosed in the drawing, a refrigeration appliance generally designated 10 is shown to comprise an outer cabinet 11 defining a freezer space 12 and an above-freezing refrigerator space 13 selectively closed by doors 14 and 15, respectively.

The cabinet is defined by an outer cabinet wall 16, an inner liner wall 17, and a body of foamed-in-place insulation 18 therebetween. Liner 17 is thermoformed into the desired liner configuration, as shown in FIG. 3, and inserted into the outer cabinet wall 16, with the insulation being foamed-in-place with the two walls held in nested, spaced relationship in a conventional foaming-in-place operation. The present invention comprehends an improved simple, low cost liner construction which provides a limited adhesion of the foamed-in-place insulation 18 thereto effectively preventing stress cracking of the liner as a result of differential thermal expansion of insulation 18 and the liner.

More specifically, as shown in FIG. 2, liner 17 includes an inner liner wall 19 and a composite release layer 20 adhered to the outer surface 21 of wall 19. Liner wall 19 may be formed of a sheet of synthetic resin material, such as acrylonitrile-butadiene-styrene, high impact polystyrene synthetic resins, etc. The release layer 20 illustratively comprises a laminate of a bonding sheet 22 and a release sheet 23. The bonding sheet may comprise an ethylene acrylic acid (EAA) copolymer which is electrostatically treated to promote adhesion to either of said liner wall materials. The release sheet 23 may be formed of unmodified low density polyethylene and may be coextruded with the EAA bonding sheet to define a two-part laminate. One such laminate film is Dow Chemical Company coextruded laminating type film PZ 1607.16. If desired, the three sheets 19, 22 and 23 may be coextruded for further simplification and cost saving.

In the illustrated embodiment, as shown in FIG. 1, the liner sheet 19 is provided from an extruder 24 to between a pair of pressure rolls 25. The release layer material 20 is fed from a suitable supply into underlying relationship with the liner sheet 19 between the rolls 25 which, by applying a preselected pressure suitable in combination with the thermal energy retained in the extruded sheet 19, effect a lamination of the polyethylene sheet portion 23 of the release layer 20 to the underside of the liner sheet 19. Upon setting of the bondment therebetween, the composite liner wall sheet material generally designated 26 is cut into suitable lengths by a conventional cutter 27 for thermoforming thereof into the desired liner configuration illustrated in FIG. 3.

As shown in FIG. 5, a modified form of liner wall material generally designated 28 may be further provided with a film 29 of suitable material to provide a barrier against the fluorinated hydrocarbon flowing agent conventionally used in the insulation foaming process. Illustratively, layer 29 may comprise a film of polyvinylidene chloride (Saran), nylon, etc.

As indicated above, where it is necessary to remove the release layer of the liner wall 19, it may be readily stripped therefrom and the liner material reused. The adhesion of release layer 20 to the liner wall is sufficient to maintain the desired bond therebetween in the normal handling of the liner during the forming and foaming processes while yet providing the desirable release from the foamed-in-place insulation to prevent stress cracking thereof as discussed above.

The foregoing disclosure of specific embodiments is illustrative of the broad inventive concepts comprehended by the invention.

Having described the invention, the embodiments of the invention in which an exclusive property or privilege is claimed are defined as follows:

1. The method of fabricating a liner for a refrigeration appliance insulated cabinet wherein the insulation is foamed-in-place, comprising the steps of: providing a liner sheet having a surface portion to which foamed-in-place insulation adheres; adhering a foam release layer on said surface portion of said liner sheet, said release layer being preselected to permit only limited adhesion thereto of insulation foamed-in-place thereagainst; and forming said sheet with said layer thereon into a refrigerator liner configuration with said layer disposed outwardly to provide for a breakable bond between the liner sheet and insulation subsequently foamed-in-place about the formed liner configuration and thereby prevent stress cracking of the liner as a result of different thermal expansion characteristics of said insulation and said liner sheet material.

2. The method of fabricating a liner of claim 1 wherein said release layer includes an outer portion formed of polyethylene.

3. The method of fabricating a liner of claim 1 wherein said release layer includes an outer portion formed of polyethylene and an inner portion engaging said liner sheet formed of ethylene acrylic acid copolymer.

4. The method of fabricating a liner of claim 1 wherein said release layer is preformed with an inner portion adapted to be laminated to the liner sheet.

5. The method of fabricating a liner of claim 1 wherein said liner sheet is extruded at a preselected elevated temperature and said release layer is preformed to have an inner portion of foam release material and an outer portion adapted to be laminated to the liner sheet while the liner sheet is at an elevated temperature.

6. The method of fabricating a liner of claim 1 wherein said release layer is preformed to have an inner portion of foam release material, and an outer portion laminated under pressure to the liner sheet.

7. The method of fabricating a liner of claim 1 wherein said release layer is provided with a barrier layer for preventing detrimental action by foam blowing agents through said release layer against said liner sheet material.

8. The method of fabricating a liner of claim 1 wherein said liner sheet is formed of synthetic resin material, and said liner sheet and said release layer are coextruded.

9. The method of fabricating a liner of claim 1 wherein said liner sheet is formed of synthetic resin material.

\* \* \* \* \*